(12) United States Patent
Reynolds et al.

(10) Patent No.: US 8,325,691 B2
(45) Date of Patent: Dec. 4, 2012

(54) METHOD AND APPARATUS FOR PROVIDING WIRELESS COMMUNICATIONS WITHIN A BUILDING

(75) Inventors: William R. Reynolds, Asheville, NC (US); Ian J. Timmins, Asheville, NC (US); Sterling Vaden, Black Mountain, NC (US); James Yanik, Asheville, NC (US); Sumio Seo, Wallingford, VT (US)

(73) Assignee: Optical Cable Corporation, Roanoke, VA (US)

( * ) Notice: Subject to any disclaimer, the term of this patent is extended or adjusted under 35 U.S.C. 154(b) by 629 days.

(21) Appl. No.: 12/566,713

(22) Filed: Sep. 25, 2009

(65) Prior Publication Data
US 2010/0080203 A1 Apr. 1, 2010

Related U.S. Application Data

(60) Provisional application No. 61/194,325, filed on Sep. 26, 2008.

(51) Int. Cl.
*H04W 4/00* (2009.01)
(52) U.S. Cl. ............ 370/338; 370/328; 455/553.1; 398/115
(58) Field of Classification Search .............. None
See application file for complete search history.

(56) References Cited

U.S. PATENT DOCUMENTS

| | | | | |
|---|---|---|---|---|
| 4,612,573 A | * | 9/1986 | Grallert et al. | 348/441 |
| 4,864,632 A | * | 9/1989 | Moriyama et al. | 725/78 |
| D308,464 S | * | 6/1990 | Freeman et al. | D8/353 |
| 5,487,666 A | * | 1/1996 | DiGiovanni | 434/72 |
| 5,548,814 A | * | 8/1996 | Lorang et al. | 370/310 |
| 5,592,471 A | * | 1/1997 | Briskman | 455/506 |
| 5,625,674 A | * | 4/1997 | Paniccia, Jr. | 370/281 |
| 5,987,335 A | * | 11/1999 | Knoedl, Jr. et al. | 455/561 |
| 6,108,331 A | * | 8/2000 | Thompson | 370/352 |
| 6,192,399 B1 | * | 2/2001 | Goodman | 725/78 |
| 6,268,827 B1 | * | 7/2001 | Paschen et al. | 342/372 |
| 6,307,862 B1 | * | 10/2001 | Silverman | 370/442 |
| 6,489,860 B1 | * | 12/2002 | Ohashi | 333/133 |

(Continued)

FOREIGN PATENT DOCUMENTS

WO 02/065229 A2 8/2002

(Continued)

OTHER PUBLICATIONS

PCT International Search Report, Application No. PCT/US2009/058374, Nov. 20, 2009.

(Continued)

*Primary Examiner* — Ian N Moore
*Assistant Examiner* — Dung B Huynh
(74) *Attorney, Agent, or Firm* — The Van Winkle Law Firm; David M. Carter

(57) ABSTRACT

A wireless distribution secured cabling system includes faceplates, each of which contains an antenna or other radiating element and an active amplifier, which serves as a bi-directional repeater for the wireless communication system. The system further includes a patch panel or distribution module which connects multiple cables, which may be either twisted pair or coaxial, to amplifier, acting as a power divider and/or an impedance matching device. An antenna, which may be mounted either outside of a building structure or inside the building structure, provides communications between the structured cabling system and a service provider base station.

4 Claims, 11 Drawing Sheets

U.S. PATENT DOCUMENTS

| | | | |
|---|---|---|---|
| 6,731,904 B1* | 5/2004 | Judd | 455/11.1 |
| 6,816,706 B1* | 11/2004 | Hohnstein et al. | 455/25 |
| 7,027,431 B1* | 4/2006 | Thompson | 370/352 |
| 7,248,831 B1* | 7/2007 | Taskin et al. | 455/8 |
| 7,324,488 B1* | 1/2008 | Rubinstein et al. | 370/338 |
| 7,463,907 B2* | 12/2008 | Smith et al. | 455/562.1 |
| 7,486,648 B1* | 2/2009 | Baranowski | 370/338 |
| 7,489,899 B2* | 2/2009 | Kobayashi et al. | 455/3.01 |
| 7,546,146 B2* | 6/2009 | Sievenpiper et al. | 455/562.1 |
| 7,558,525 B2* | 7/2009 | Perlman | 455/3.01 |
| 7,590,144 B1* | 9/2009 | Ladd | 370/466 |
| 7,640,035 B2* | 12/2009 | Jang et al. | 455/551 |
| 7,729,656 B2* | 6/2010 | Van Buren | 455/7 |
| 8,006,104 B1* | 8/2011 | Sivertsen | 713/300 |
| 8,036,594 B2* | 10/2011 | Schadler | 455/25 |
| 8,040,235 B2* | 10/2011 | Koga et al. | 340/538 |
| 2002/0126574 A1* | 9/2002 | Downey et al. | 367/14 |
| 2002/0174423 A1* | 11/2002 | Fifield et al. | 725/1 |
| 2003/0099228 A1* | 5/2003 | Alcock | 370/353 |
| 2004/0046674 A1* | 3/2004 | Andrews et al. | 340/657 |
| 2004/0158649 A1* | 8/2004 | Ophir et al. | 709/250 |
| 2004/0160908 A1* | 8/2004 | Perlman | 370/328 |
| 2004/0176027 A1* | 9/2004 | O'Neill | 455/7 |
| 2004/0187156 A1* | 9/2004 | Palm et al. | 725/81 |
| 2005/0055729 A1* | 3/2005 | Atad et al. | 725/118 |
| 2005/0152306 A1* | 7/2005 | Bonnassieux et al. | 370/328 |
| 2005/0254442 A1* | 11/2005 | Proctor et al. | 370/294 |
| 2005/0254470 A1* | 11/2005 | Yashar | 370/338 |
| 2006/0025072 A1* | 2/2006 | Pan | 455/11.1 |
| 2007/0004363 A1* | 1/2007 | Kusaka et al. | 455/269 |
| 2007/0041339 A1* | 2/2007 | Binder | 370/264 |
| 2007/0135120 A1* | 6/2007 | King et al. | 455/426.2 |
| 2007/0173202 A1* | 7/2007 | Binder et al. | 455/68 |
| 2007/0232228 A1* | 10/2007 | McKay et al. | 455/11.1 |
| 2007/0254714 A1* | 11/2007 | Martich et al. | 455/561 |
| 2007/0275595 A1* | 11/2007 | Hazani et al. | 439/536 |
| 2008/0094187 A1* | 4/2008 | Chan et al. | 340/310.12 |
| 2008/0137821 A1* | 6/2008 | Ho | 379/90.01 |
| 2008/0146270 A1* | 6/2008 | Rofougaran | 455/552.1 |
| 2008/0188965 A1* | 8/2008 | Bruey | 700/94 |
| 2008/0212502 A1* | 9/2008 | Zhen et al. | 370/295 |
| 2009/0316671 A1* | 12/2009 | Rolf et al. | 370/338 |
| 2011/0044693 A1* | 2/2011 | Kelly et al. | 398/116 |

FOREIGN PATENT DOCUMENTS

| | | |
|---|---|---|
| WO | 02/065229 A3 | 8/2002 |
| WO | 2008/009968 A1 | 1/2008 |

OTHER PUBLICATIONS

Written Opinion of the International Searching Authority; Application No. PCT/US2009/058374, Nov. 20, 2009.

PCT International Preliminary Report on Patentability and Written Opinion of the International Searching Authority; PCT/US2009/058374; dated Apr. 7, 2011.

* cited by examiner

METHOD AND APPARATUS FOR PROVIDING WIRELESS COMMUNICATIONS WITHIN A BUILDING

RELATED APPLICATION

This is a U.S. non-provisional application relating to and claiming the benefit of U.S. Provisional Patent Application Ser. No. 61/194,325, filed Sep. 26, 2008.

BACKGROUND OF THE INVENTION

This invention relates to a method and apparatus for providing wireless communications within a building. The demand for wireless communications has grown substantially over the past few years, primarily because it enables users to communicate over a wide range of locations. This demand has been met in part by the placement of numerous cellular towers around the country. However, wireless communication within a building often does not work well, notwithstanding the existence of numerous towers outside of the building. One problem encountered by wireless communication systems within a building is the obstruction of and interference with the wireless signal. Physical structures, such as concrete block walls, metal covered wall insulation, and electromagnetic devices such as cordless phones and microwave ovens, can cause a wireless signal to fade. U.S. Pat. No. 7,406,300 to Pan notes the popularity and increased capability of wireless communication apparatus, noting that such apparatus offer voice, data and video communication capabilities to cell phones, personal digital assistants and lap top computers that are carried by individuals. However, according to U.S. Pat. No. 7,406,300 to Pan, a limitation on such communications has been the difficulty in obtaining signal within a structure such as a residential home, for example. Among the factors contributing to this difficulty is the inherently limited radio frequency (RF) coverage in and around building structures on account of the metallic content of a building structure that can provide an RF block or otherwise interfere with adequate signal transmission. For example, the siding on the exterior of the building, the insulation, or window treatments may include metal or foil, which reduces RF coverage within the building structure. Additionally, the various metal objects and the structure of the internal walls, for example, in many cases prevent adequate interior RF coverage so that individually carried cell phones, personal digital assistants and lap top computers cannot consistently receive or transmit a signal at the full range of desired user locations within the building structure.

One known technique for providing RF coverage within buildings calls for a repeater antenna to be located on a suitable signal reception such as a rooftop or tower. The repeater captures an outside RF signal, boosts the signal, and directs the boosted signal towards buildings. However, the metallic content of a building structure may interfere with the directed RF signal. The resulting coverage within the building is thus unpredictable. Factors such as a call location inside the building, the building location relative to the serving base station location, building construction, repeater site location, and orientation of the repeater antennas can influence and render unpredictable the RF signal capability within the building.

Another known technique for providing RF coverage within buildings calls for inside and outside repeater antennas to bypass building penetration losses, uses an outside antenna to capture macrocell RF signals, a coax cable to bypass building penetration losses, a repeater for signal boosting, and one or more inside antennas to create inside RF coverage where desired. The outside antenna may be installed on a rooftop pointing at the serving macrocell, a long coax cable connected to the outside antenna brings the RF signal inside, and a repeater boosts the signal and feeds one or more inside antennas. The set up of a dedicated network of inside antennas involves the installation of cabling and associated hardware and this can amount to an overly expensive approach for improving RF signal coverage within a building.

Thus, there is a need for an improved method and apparatus for providing wireless communications within a building. Such an improved method and apparatus will preferably provide RF coverage within a building structure facilitating communication between an external RF source and wireless communication apparatus such as cell phones, personal digital assistants and lap top computers that are carried by individuals while improving the optimization of existing systems within the building that can assist in receiving and transmitting RF signals.

SUMMARY OF THE INVENTION

According to the present invention, there is provided a communication system, including a lightning protection element, a distribution module, a plurality of wall outlet assemblies, and a plurality of conduit stems. Each conduit stem is connected to a respective wall outlet assembly and is operable to carry signals between the respective wall outlet assembly and a location at which the distribution module obtains the signals. The distribution module and each wall outlet assembly have an operating relationship between each other such that both a bridging signal and a separate task signal can be carried between the distribution module and the respective wall outlet assembly with the particular signal being carried on the respective conduit stem connected to the wall outlet assembly. The distribution module and the lightning protection element are operatively connected to one another such that bridging signals pass therebetween. The lightning protection element is operable to transmit or receive wireless signals. Each wall outlet assembly has a capability to transmit a wireless signal to, or receive a wireless signal from, a wireless signal device and, in the event that the wall outlet assembly transmits a wireless signal, the wall outlet assembly generates the wireless signal in response to a bridging signal provided to the wall outlet assembly via the distribution module. In the event that the wall outlet assembly receives a wireless signal, the wall outlet assembly sends a corresponding bridging signal along its conduit to ultimately reach the distribution module. Each wall outlet assembly has an access portion for access between the wall outlet assembly and a separate task executing device such that separate task signals can be passed between the wall outlet assembly and the separate task executing device.

According to one aspect of the present invention, the communication system includes a direct current (DC) power injector component operatively coupled to the distribution module for processing both separate task signals in the form of DC power signals and bridging signals such that the DC power signals and the bridging signals are isolated from one another during their transmission to a wall outlet assembly.

According to a feature of the one aspect of the present invention, the direct current (DC) power injector component of the communication system includes a signal input arrangement for accepting for processing DC power signals transmitted by a power supply and bridging signals transmitted by the distribution module.

According to another feature of the one aspect of the present invention, the communication system further includes a signal output arrangement for distribution of combined DC power signals and bridging signals to the wall outlet assemblies.

According to yet another feature of the one aspect of the present invention, the DC power injector component of the communication system includes at least one filter arrangement for isolating DC power signals from the bridging signals.

According to yet another additional feature of the one aspect of the present invention, the communication system includes at least one filter arrangement which includes an inductor or high frequency filtering mechanism.

According to another further feature of the one aspect of the present invention, the communication system includes at least one filter arrangement which includes a high frequency choke.

According to still yet another feature of the one aspect of the present invention, the DC power injector component of the communication system is configured for receiving, processing, and distributing DC power signals and bridging signals while preventing contamination of the DC power signals and the bridging signals with one another via operation of a filter operatively disposed between a signal input arrangement for receiving the DC power signals and the bridging signals and a signal output arrangement for transmission of the DC power signals and the bridging signals.

According to another aspect of the present invention, the distribution module of the communication system includes a first signal power booster for increasing the power of bridging signals on a first frequency band received from the lightning protection element.

According to yet another aspect of the present invention, the distribution module of the communication system includes a second signal power booster for increasing the power of bridging signals on a second frequency band received from the lightning protection element.

According to still yet another aspect of the present invention, the distribution module of the communication system includes a first signal power booster for increasing the power of bridging signals on a first frequency band received from the lightning protection element, a second signal power booster for increasing the power of bridging signals on a second frequency band received from the lightning protection element, and an isolating device for isolating the first signal power booster and the second signal power booster from one another.

According to a feature of the one aspect of the present invention, the isolating device of the communication system includes a diplexer having a common input port and a pair of output ports. The common input port of the diplexer is operable to receive both bridging signals on the first frequency band and bridging signals on the second frequency band. One of the pair of output ports is operable to permit bridging signals on the first frequency band to exit the diplexer but not bridging signals on the second frequency band. The other of the pair of output ports is operable to permit bridging signals on the second frequency band to exit the diplexer but not bridging signals on the first frequency band.

According to an additional aspect of the present invention, the lightning protection element of the communication system is an antenna operable to receive and transmit wireless signals. The distribution module is a patch panel. Each of the conduit stems interconnects the patch panel and a wall outlet assembly and is formed of a twisted wire pair.

According to another additional aspect of the present invention, the lightning protection element of the communication system is an antenna operable to receive and transmit wireless signals. The distribution module is a patch panel. Each of the conduit stems interconnects the patch panel and a wall outlet assembly and is formed of a coaxial cable.

According to yet another additional aspect of the present invention, the lightning protection element of the communication system is an antenna operable to receive and transmit wireless signals. Each of the conduit stems interconnects the distribution module and a wall outlet assembly, and is formed of a twisted wire pair or a coaxial cable. At least one of the wall outlet assemblies is powered via a power source that supplies power to the wall outlet assembly independently of the respective conduit stem connected to the wall outlet assembly.

According to still yet another additional aspect of the present invention, the communication system includes the lightning protection element which is an antenna operable to receive and transmit wireless signals. Each of the conduit stems interconnects the distribution module and a wall outlet assembly and is formed of a twisted wire pair or a coaxial cable. At least one of the wall outlet assemblies is powered via a power source that supplies power to the wall outlet assembly via the respective conduit stem connected to the wall outlet assembly.

According to a further aspect of the present invention, the communication system includes the lightning protection element which is an antenna operable to receive and transmit wireless signals. Each of the conduit stems interconnects the distribution module and a wall outlet assembly. At least one of the wall outlet assemblies includes a first signal power booster for increasing the power of bridging signals.

According to one feature of the further aspect of the present invention, the at least one of the wall outlet assemblies of the communication system includes a first diplexer operatively connected with the first signal power booster.

According to another feature of the further aspect of the present invention, the at least one of the wall outlet assemblies of the communication system includes a second signal power booster for increasing the power of bridging signals and a second diplexer operatively connected with the second signal power booster.

According to another additional feature of the further aspect of the present invention, the at least one of the wall outlet assemblies of the communication system includes a resistive trimming function for manually adjusting an output power of a signal processed by one of the associated pairs of the first signal power booster and the first diplexer and the second signal booster and the second diplexer.

According to another further aspect of the present invention, the communication system further includes a television (TV) injector component operatively coupled to the distribution module for processing both separate task signals in the form of DC power signals and bridging signals such that the DC power signals and the bridging signals are isolated from one another during their transmission to a wall outlet assembly.

According to one feature of the another further aspect of the present invention, the TV injector component of the communication system includes a signal input arrangement for accepting TV signals from a cable TV signal distribution assembly and bridging signals transmitted by the distribution module.

According to another feature of the another further aspect of the present invention, the communication system further includes a signal output arrangement for distribution of combined TV signals and bridging signals to a cable-based TV signal distribution system.

According to yet another feature of the another further aspect of the present invention, the wall outlet assembly system includes the TV injector component which is configured to combine the TV signals and the bridging signals for transmission to the wall outlet assemblies.

According to still yet another feature of the another further aspect of the present invention, the communication system includes the bridging signals which are associated with predetermined frequencies and the TV injector component includes at least one filter arrangement for removing TV signals that may be present on the bridging signal frequencies.

According to an additional feature of the another further aspect of the present invention, the bridging signals of the communication system are associated with predetermined frequencies and the TV injector component includes a plurality of filter arrangements for rejecting TV signals that may be present on the bridging signal frequencies.

According to an attribute of the additional feature of the another further aspect of the present invention, the communication system includes at least one of the plurality of filter arrangements which includes a low-pass filter circuit.

According to another additional feature of the another further aspect of the present invention, the communication system further includes a signal power booster for increasing the power of the bridging signals operatively coupled to the TV injector component and the TV injector component includes at least one filter circuit for preventing the TV signals from being directed into an operating band of the signal power booster.

According to yet another additional feature of the another further aspect of the present invention, the TV injector component of the communication system is configured for receiving, processing, and distributing a plurality of TV signals and the bridging signals while preventing contamination of the TV signals and the bridging signals with one another via operation of a filter operatively disposed between a signal input arrangement for receiving the TV signals and the bridging signals and a signal output arrangement for distribution of the TV signals and the bridging signals.

According to still yet another additional feature of the another further aspect of the present invention, the communication system includes at least one wall outlet assembly which includes a filter arrangement for discerning TV signals and bridging signals for selective dissemination.

According to yet another further aspect of the present invention, the wall outlet assembly includes a signal handling element, a regional antenna, and an access portion. The wall outlet assembly is connectable to a conduit stem that is operable to carry signals between the wall outlet assembly and a location at which a distribution module of a communication system obtains the signals. The signal handling element is operable in coordination with the distribution module such that both a bridging signal and a separate task signal can be carried between the distribution module and the signal handling element with the distribution module further forwarding bridging signals to a lightning protection element of the communication system or further forwarding bridging signals to the signal handling element. The signal handling element is operable to handle bridging signals derived from wireless signals received by the lightning protection element and further forwarded to the signal handling element by the distribution module as bridging signals. The antenna is operable to transmit a wireless signal to, or receive a wireless signal from, a wireless signal device. In the event that the wall outlet assembly transmits a wireless signal, the wall outlet assembly generates the wireless signal in response to a bridging signal provided to the wall outlet assembly via the distribution module, and, in the event that the wall outlet assembly receives a wireless signal, the wall outlet assembly sends a corresponding bridging signal along its conduit to ultimately reach the distribution module. The access portion provides access between the wall outlet assembly and a separate task executing device such that separate task signals can be passed between the wall outlet assembly and the separate task executing device.

According to still yet another further aspect of the present invention, the communication port includes a conduit stem and a wall outlet assembly. The wall outlet assembly includes a signal handling element. The present invention also includes a regional antenna and an access portion. The wall outlet assembly is connected to the conduit stem and the conduit stem is operable to carry signals between the wall outlet assembly and a location at which a distribution module of a communication system obtains the signals. The signal handling element is operable in coordination with the distribution module such that both a bridging signal and a separate task signal can be carried between the distribution module and the signal handing element with the distribution module further forwarding bridging signals to a lightning protection element of the communication system or further forwarding bridging signals to the signal handling element. The signal handling element is operable to handle bridging signals derived from wireless signals received by the lightning protection element and further forwarded to the signal handling element by the distribution module as bridging signals. The antenna is operable to transmit a wireless signal to, or receive a wireless signal from, a wireless signal device. In the event that the wall outlet assembly transmits a wireless signal, the wall outlet assembly generates the wireless signal in response to a bridging signal provided to the wall outlet assembly via the distribution module, and, in the event that the wall outlet assembly receives a wireless signal, the wall outlet assembly sends a corresponding bridging signal along its conduit to ultimately reach the distribution module. The access portion provides access between the wall outlet assembly and a separate task executing device such that separate task signals can be passed between the wall outlet assembly and the separate task executing device.

BRIEF DESCRIPTION OF THE DRAWINGS

An embodiment of the present invention is now described with reference to the following figures of the drawings.

DETAILED DESCRIPTION OF AN EMBODIMENT

Figure 1:
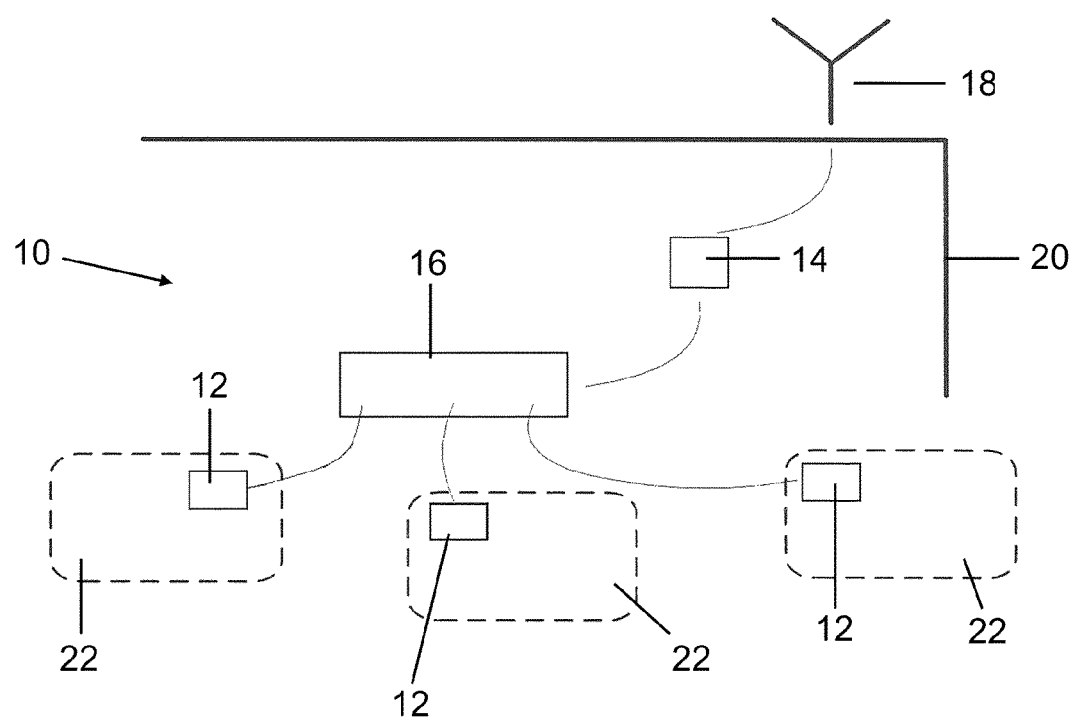
FIG. 1 is a schematic representation of an arrangement for implementing the method of the present invention.

FIG. 1 shows the overall basic architecture of a wireless distribution secured cabling system 10. The wireless distribution secured cabling system not only supports cellular service provider communications, but also supports other wireless technologies such as local area wireless networks, including networks governed by IEEE 802.11 Wireless LANs. As seen in FIG. 1, the wireless distribution secured cabling system 10 includes faceplates 12, each of which contains an antenna or other radiating element and an active amplifier 14, which serves as a bi-directional repeater for the wireless communication system. The system further includes a patch panel or distribution module 16 which connects multiple cables, which may be either twisted pair or coaxial, to amplifier 14, acting as a power divider and/or an impedance matching device.

Antenna 18, which may be mounted either outside of a building structure 20 or inside the building structure, is provided. An antenna 18 provides communications between the structured cabling system and a service provider base station, whereby the structured cabling system provides improved service for the wireless user. While the antenna 18 may be mounted inside building structure 20, its overall purpose is to provide primary communications between the patch panel 16 and the external service provider, such as a cellular phone service provider.

The cabling between patch panel 16 and the faceplates 12 already exists in most buildings and, as previously indicated, may be coaxial or twisted pair in nature. Patch panel 16 may perform the functionality of converting the coaxial connection to the active repeater from unbalanced to balanced cabling systems (coaxial and twisted pair respectively). Faceplates 12 contain an antenna element for providing improved local wireless coverage for regions 22 which are in close proximity to each faceplate's installed location and may be fed by either balanced or unbalanced cabling from patch panel 16.

Patch panel 16 and the faceplates 12 may be installed as a retrofit to leverage existing installed structured cabling systems whereby the active hardware is contained within one (1) enclosure which provides connectivity on a port per port basis to a second patch panel, configured for such applications as data cabling.

The faceplates 12 with the antenna elements may replace a previously installed data jack in an existing structured cabling system.

Figure 2:
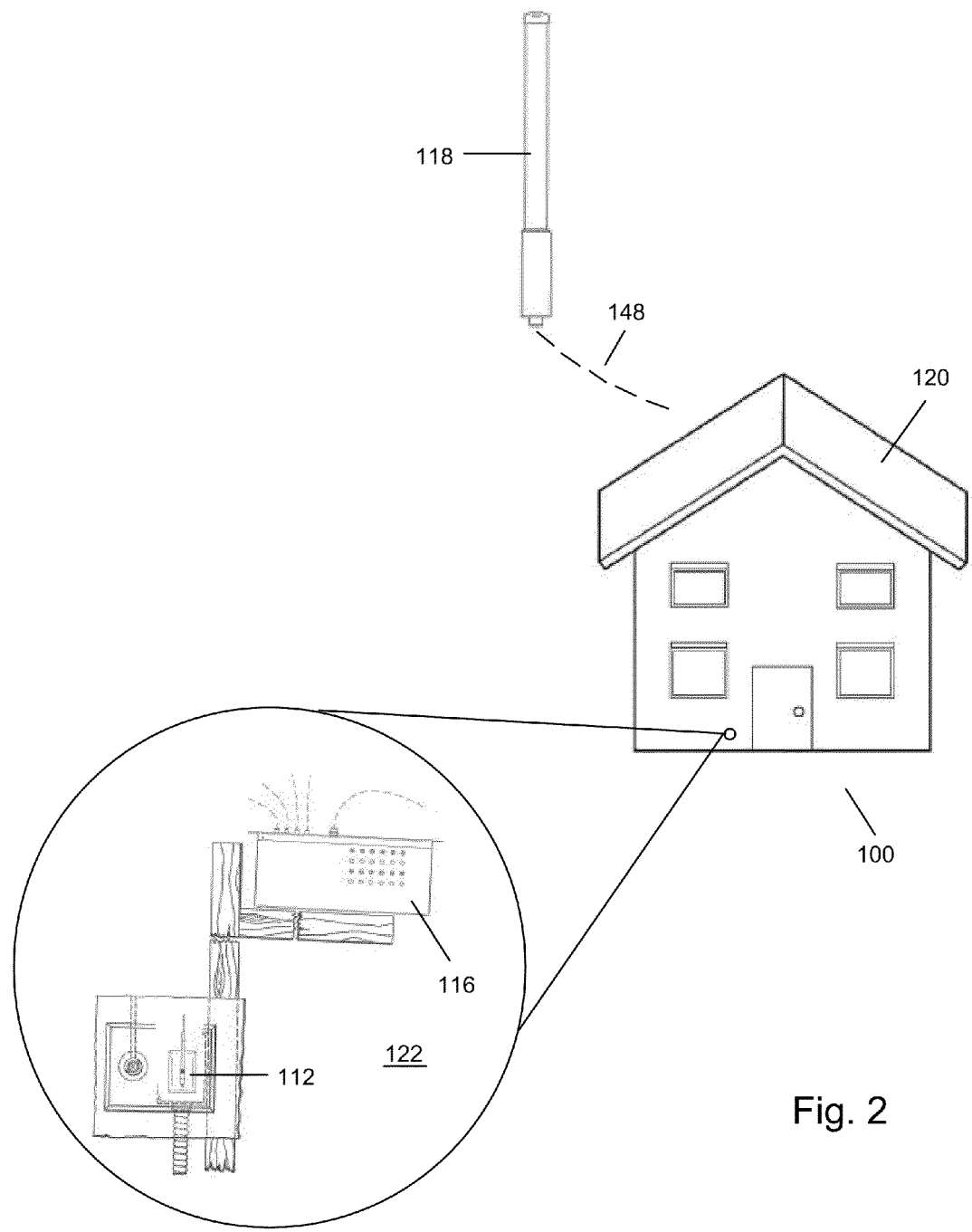
FIG. 2 is a perspective view of one embodiment of the apparatus of the present invention and showing the communication system of the present invention.

With reference now to FIG. 2, one embodiment of the communication system of the present invention is illustrated that represents an implementation of the wireless distribution secured cabling system 10 described with respect to FIG. 1. As seen in FIG. 2, a communication system 100 includes a lightning protection element in the form of an antenna 118, a distribution module in the form of a patch panel 116, and a plurality of wall outlet assemblies 112. Each wall outlet assembly comprises components that, as hereinafter disclosed in more detail, provide improved local wireless coverage for regions within a building structure, such as a building 120 having a plurality of regions 122 illustrated in FIG. 2, and, in selected circumstances, a wall outlet assembly may include a structural component conventionally known as a "faceplate" that operates as a cover or a facade on a wall outlet assembly installed, for example, through an opening in an interior wall of a building structure. Solely for the purposes of definition within this disclosure, each wall outlet assembly 112 generally corresponds to the faceplate described with respect to FIG. 1, it being understood that the respective wall outlet assembly comprises components that provide improved local wireless coverage for regions within a building structure and that the wall outlet assembly may or may not additionally include a structural component conventionally known as a "faceplate" that operates as a cover or a facade on the wall outlet assembly.

Figure 5:
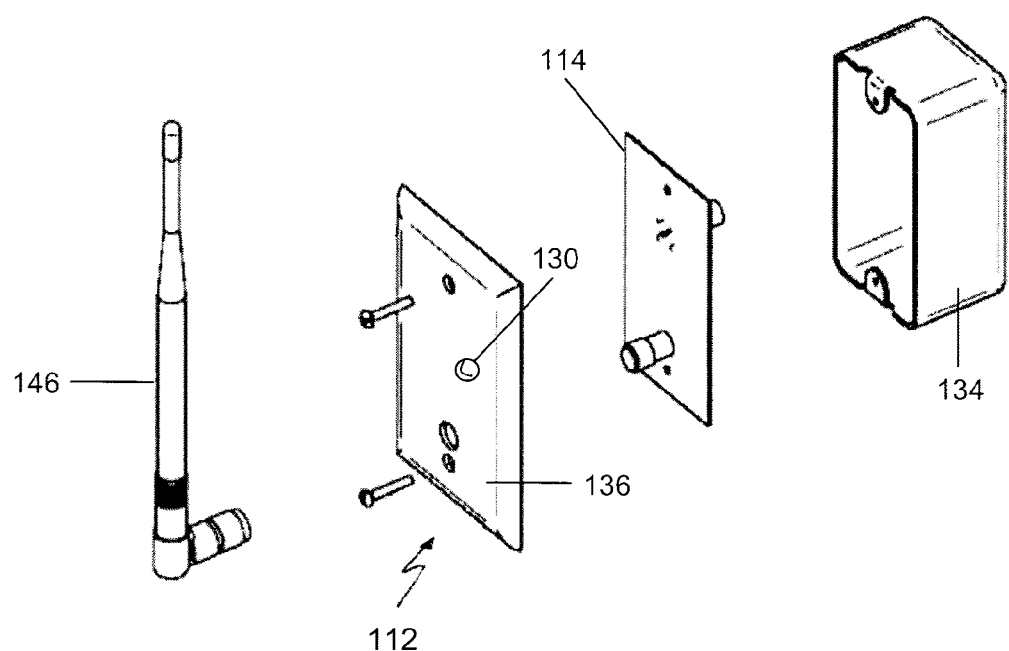
FIG. 5 is an exploded perspective view of one of the wall outlet assemblies shown in FIG. 4.

Each wall outlet assembly 112 is provided with an active power booster 114, illustrated in FIG. 5, that serves as a bi-directional repeater for the communication system 100. The external antenna 118 may be, for example, an external antenna operated by a cellular telephone service provider and is located externally to a building 120. The building 120 can be, for example, a residential home, an office building, a factory, or any other structure in which it is desired to enhance the ability of persons in the building structure to receive and transmit wireless signals.

Figure 3:
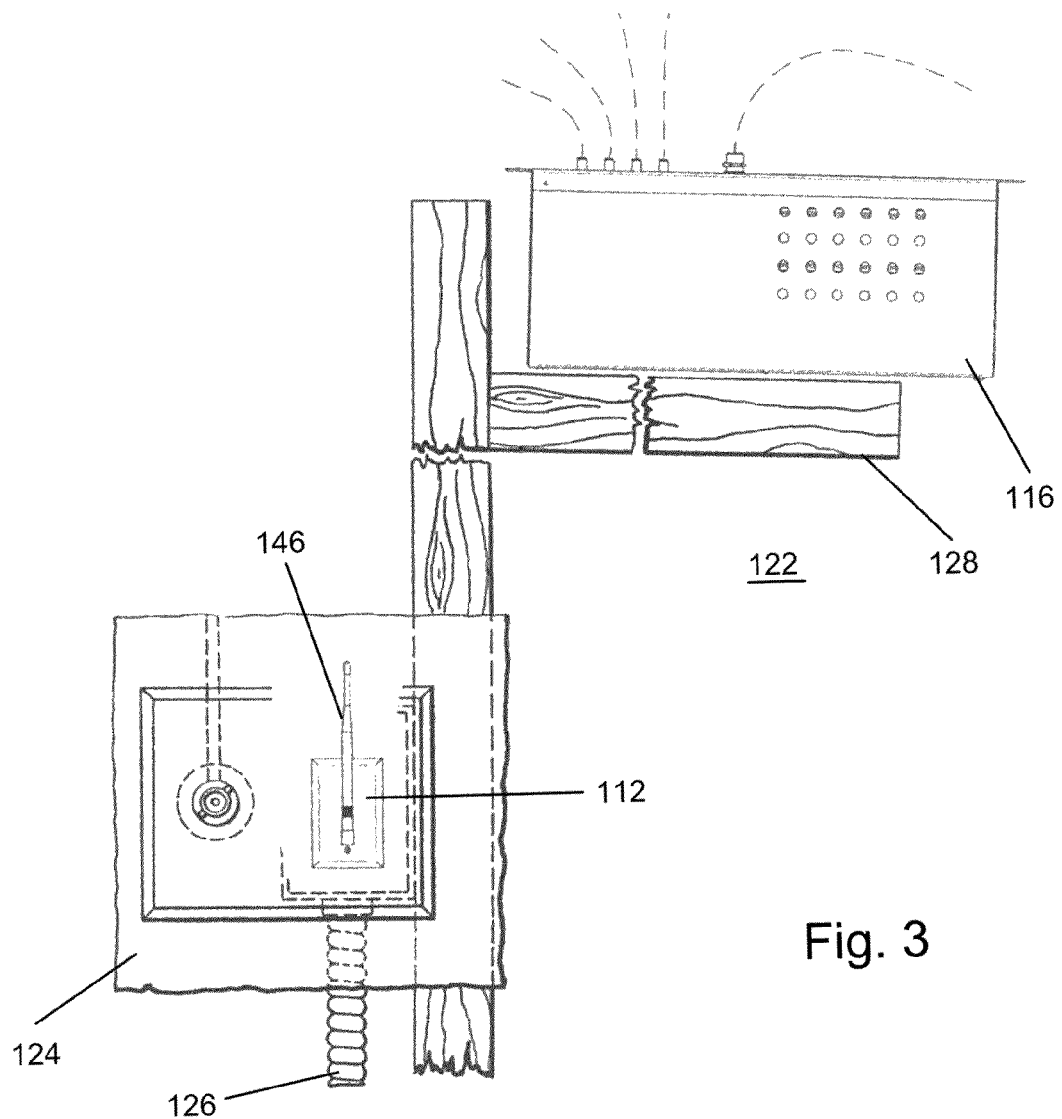
FIG. 3 is an enlarged perspective view of a portion of the communication system shown in FIG. 2.

With reference now to FIG. 3, which is an enlarged perspective view of one of the wall outlet assemblies 112 mounted in a respective region 122 of the building 120 in which it is desired to receive and transmit wireless signals, the wall outlet assembly 112 is fixedly mounted to a an interior vertical wall 124 of the building 120. The illustrated wall outlet assembly 112 comprises a cover or "facade" and the wall outlet assembly is mounted such that the "facade" thereof is disposed outwardly of the interiorly facing surface of the interior vertical wall 124 that forms together with other interior walls a respective room of the building 120 in which the respective region 122 is located. A conduit stem in the form of a coaxial cable 126 is operatively connected to the wall outlet assembly 112 and is connected, as well, to the patch panel 116. The coaxial cable 126 is operable to carry bridging signals and separate task signals between the wall outlet assembly 112 and the patch panel 116.

As seen in FIG. 3, the patch panel 116 can be located in the interior of the building structure 120 such as, for example, at a location at which the patch panel 116 is supported on a horizontally extending shelf 128. Alternatively, the patch panel 116 can be located in a purpose-built cabinet, relay rack, equipment rack, or other structure in the building 120 or, moreover, can be located in a separately standing structure that is within the vicinity of the building 120.

The patch panel 116 and each of the wall outlet assemblies 112 has an operating relationship such that both a bridging signal and a separate task signal can be carried between the patch panel 116 and the respective wall outlet assembly 112 with the particular respective signal being carried on the respective conduit stem (i.e., the coaxial cable 126) connected to the respective wall outlet assembly 112. The patch panel 116 and the external antenna 118 are operatively connected to one another such that bridging signals pass therebetween. Also, the patch panel 116 is operatively connected to a device such as, for example, a separate task signal transmitter or receiver which is shown merely for exemplary purposes herein as a CATV signal generator 154 in the form of a set box that is operable to provide CATV signals to the patch panel 116. The CATV signals received by the patch panel 116 are further transmitted as separate task signals via the coaxial cables 126 to the wall outlet assemblies 112, whereat one or more separate task-executing devices receive the separate task signals from these wall outlet assemblies 112, as will be described in more detail below.

The external antenna 118 is operable to transmit or receive wireless signals. Each wall outlet assembly 112 has a capability to transmit a wireless signal to, or receive a wireless signal from, a wireless signal device which may be in the form, for example, of a hand-held cellular telephone, a personal digital assistant (PDA), or any other device operable to transmit and/or receive wireless signals. In the event that the wall outlet assembly 112 transmits a wireless signal, the wall outlet assembly generates the wireless signal in response to a bridging signal provided to the wall outlet assembly via the patch panel 116. In the event that the wall outlet assembly 112 receives a wireless signal, the wall outlet assembly sends a corresponding bridging signal along its conduit stem (i.e., along the respective connected coaxial cable 126) to ultimately reach the patch panel 116.

Figure 4A:
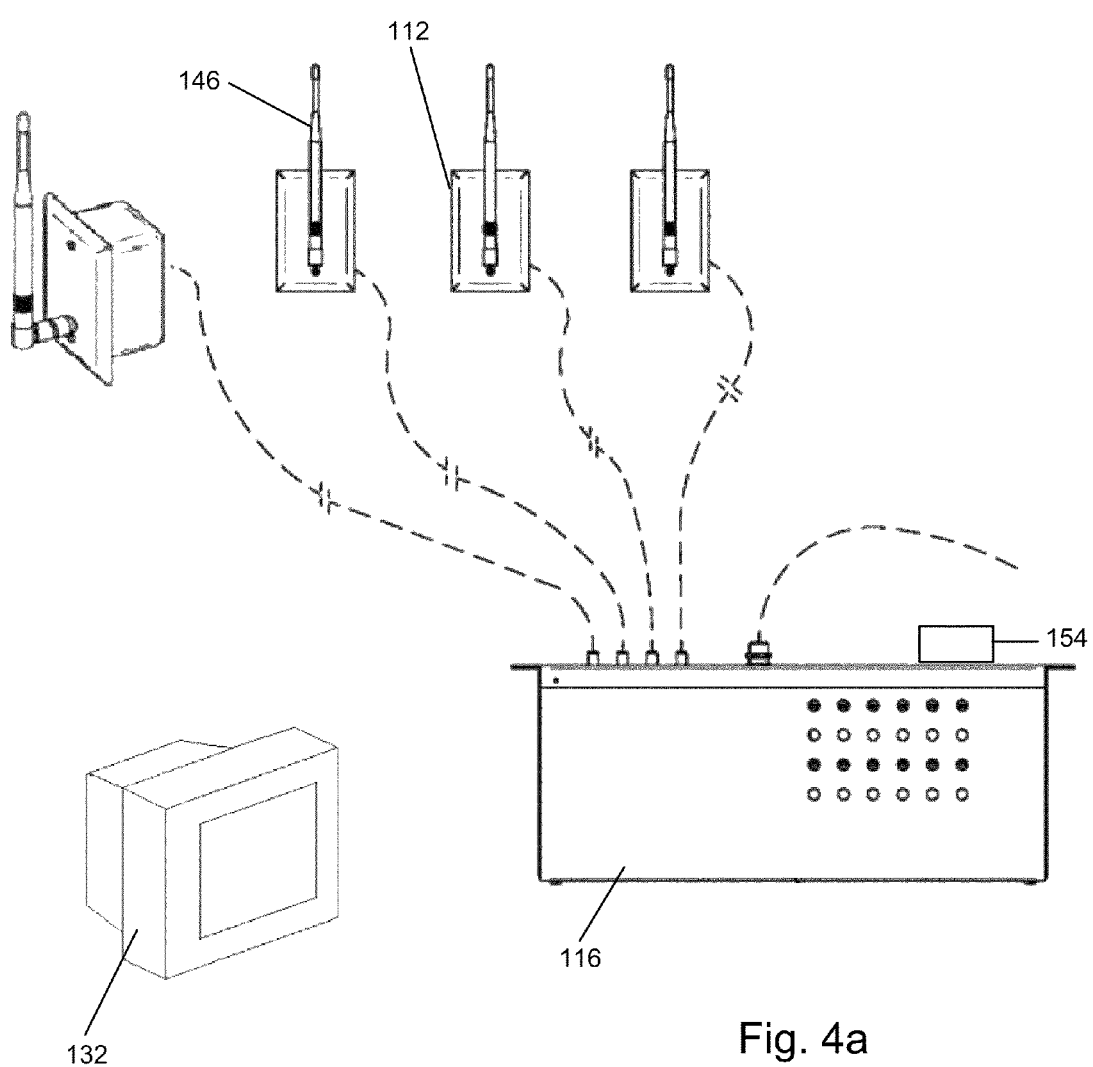
FIG. 4a is an enlarged perspective view of the distribution module and the wall outlet assemblies of the communication system shown in FIG. 1

Each wall outlet assembly 112 has an access portion for access between the wall outlet assembly 112 and a separate task-executing device such that separate task signals can be passed between the wall outlet assembly 112 and the separate task-executing device. With reference to FIG. 5, the wall outlet assembly 112 illustrated therein has an access portion 130 configured as a conventional CATV outlet via which a CATV input or output cable of, for example, a CATV Monitor 132 (shown in FIG. 4*a*) can be operatively coupled to the wall outlet assembly 112.

Figure 6:
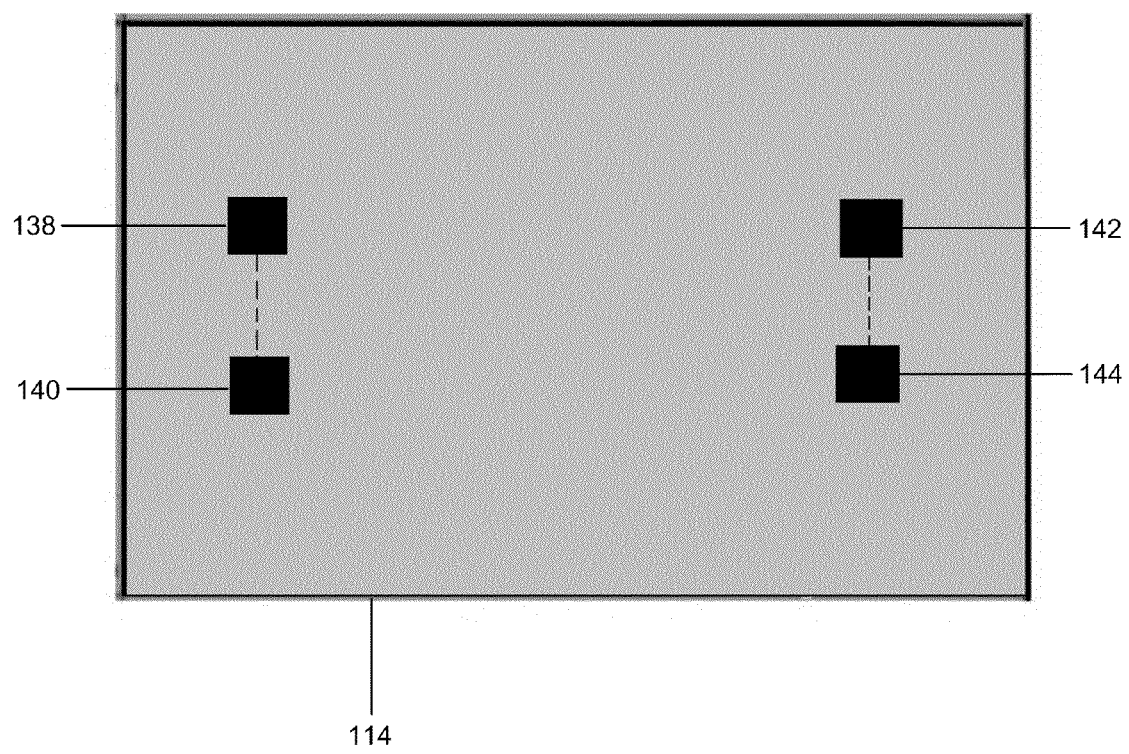
FIG. 6 is a schematic representation of a printed circuit board for operation with the wall outlet assembly shown in FIG. 5.

With reference now to FIG. 6, which is a schematic representation of a printed circuit board 114, the printed circuit board 114 is fixedly mounted in an outlet housing 134, shown in FIG. 5, and is covered by a "facade" cover 136. The printed circuit board 114 is provided with several capabilities to handle a radio frequency (RF) wireless signal. The printed circuit board 114 includes a multiplexer in the form of a first diplexer 138 that is operatively connected with a first signal power booster 140 that is operable to boost bridging signals. The printed circuit board 114 also includes a second diplexer 142 operatively connected with a second signal power booster 144. Each wall outlet assembly 112 is provided with a regional antenna 146 that is operatively connected to the respective coaxial cable 126 of the wall outlet assembly. An RF signal received by the wall outlet assembly 112 is broken up into two channels—an uplink from the respective wireless device to the external antenna 118 and a downlink comprised of communications from the external antenna 118 to the wireless device. The first diplexer 138 and the second diplexer 142 direct the RF signals of the uplink and the downlink channels such that these RF signals are boosted in the appropriate direction. Specifically, the RF signal in the downlink channel is boosted such that a greater signal is incident upon a respective regional antenna 146 operatively connected to each respective wall outlet assembly 112 and an RF signal in the uplink channel is boosted in the direction from the respective regional antenna 146 toward the external antenna 118. The first power booster 140 and the second signal power booster 144 cooperate with the respective associated diplexer to boost the RF signal in the uplink and downlink channels in the appropriate direction. The wall outlet assembly 112 also has a resistive trimming function such that the output power of either RF signals in the uplink channel or RF signals in the downlink channel can be adjusted. Other filtering mechanisms can be used in combination to separate signals at the wall outlet assembly 112 as well.

Figure 4B:
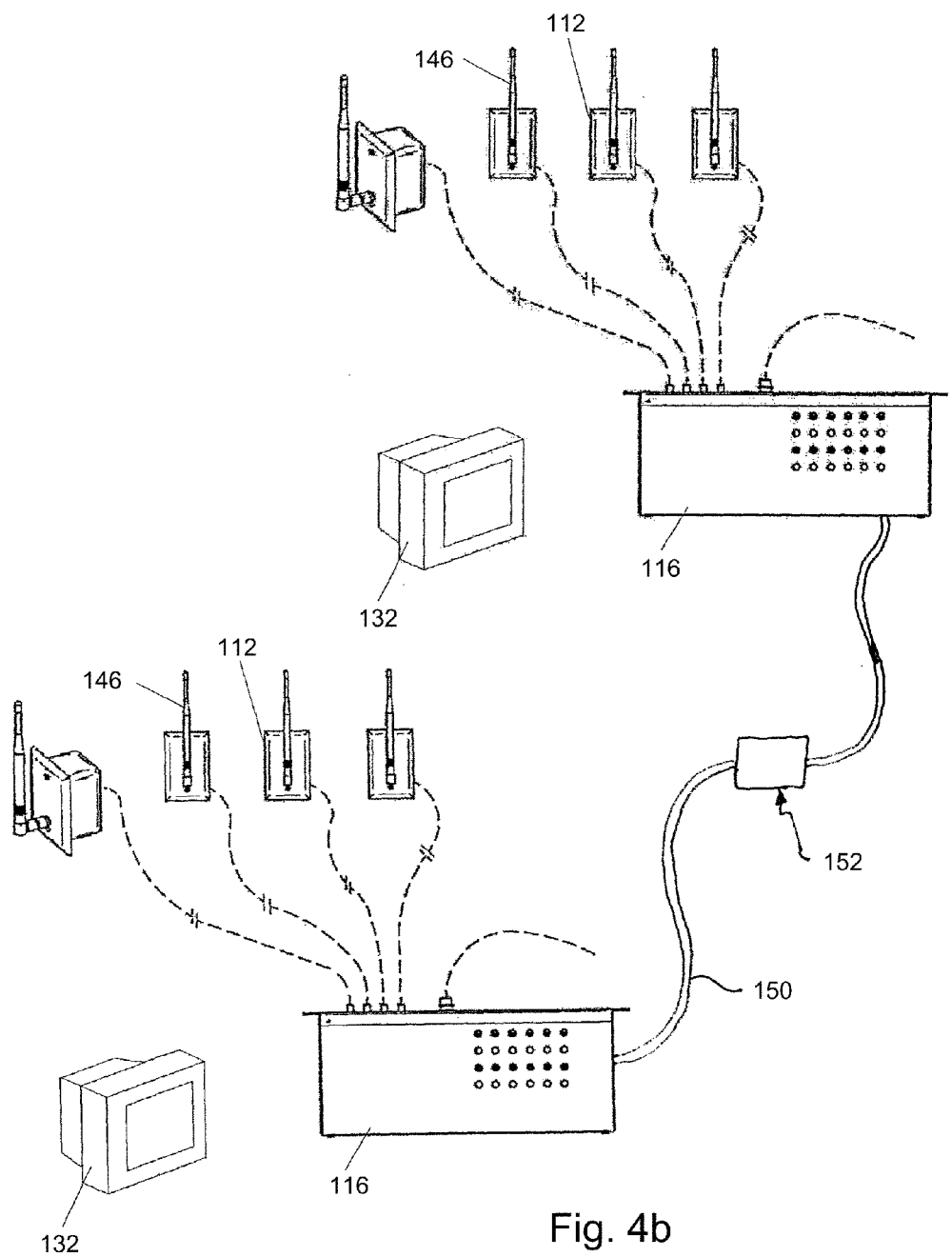
FIG. 4b is a perspective view of a pair of distribution modules and their associated wall outlet assemblies of the communication system.

According to a further aspect of the present invention, the communication system 100 may include sub-circuitry to automatically attenuate and limit the radio frequency (RF) power to multiple panels connected in series. For example, as shown in FIG. 4*b*, a plurality of patch panels 116 can be provided and connected in series with one another in a "daisy-chain" manner with a respective one of the patch panels 116 being operatively coupled to the external antenna 118 via, for example, a cable 148. The next patch panel 116—i.e., a "slave" patch panel—in the series is then coupled to the "master" or "home" patch panel 116 and can receive bridging signals from the "home" patch panel 116 provided along a branch cable 150. An automated attenuator 152 is operatively coupled to this next patch panel 116 to automatically attenuate and limit RF power transmitted from the "home" patch panel 116 such that a maximum power transmission load can be controlled via this process.

Figure 7:
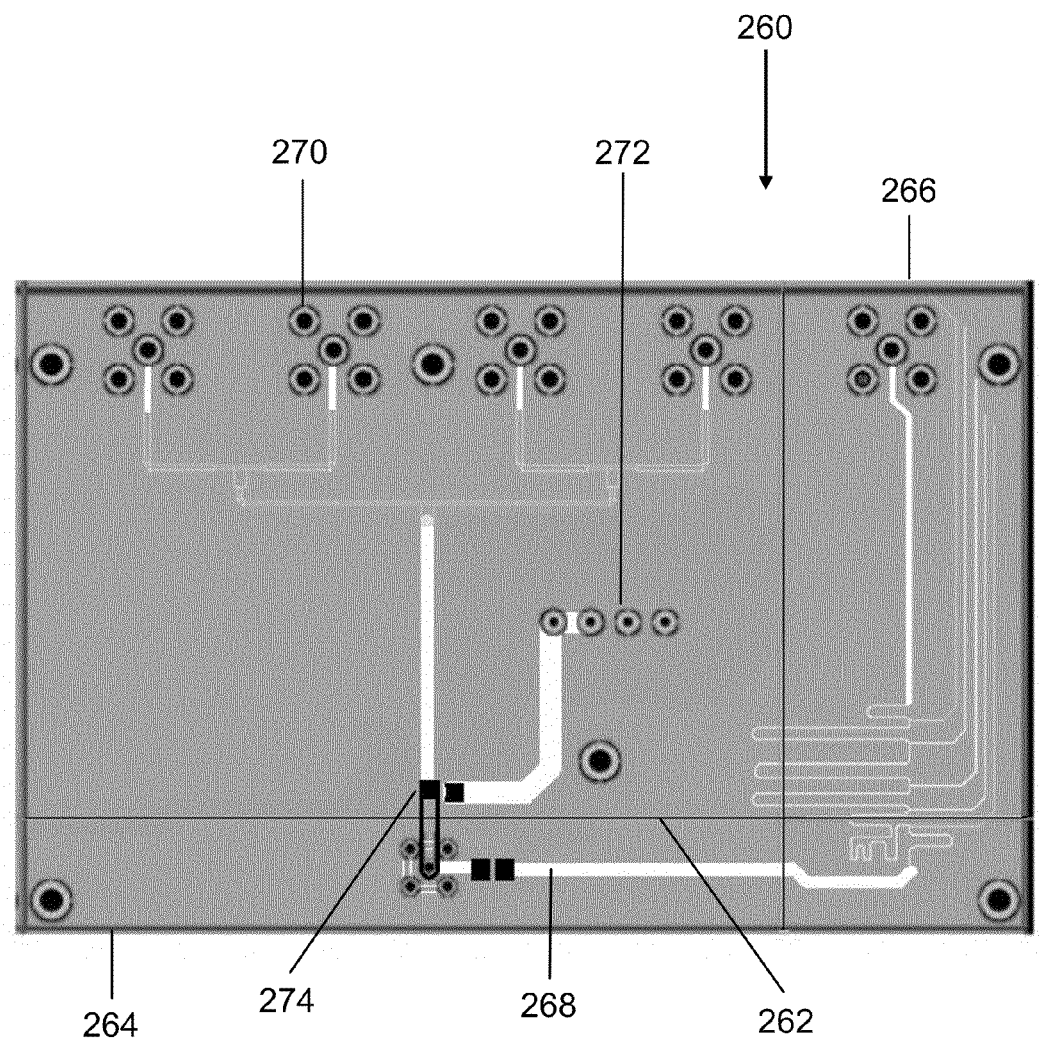
FIG. 7 is a schematic printed circuit representation of a DC power injector component for operation with the wall outlet assembly shown in FIG. 5.
Figure 8:
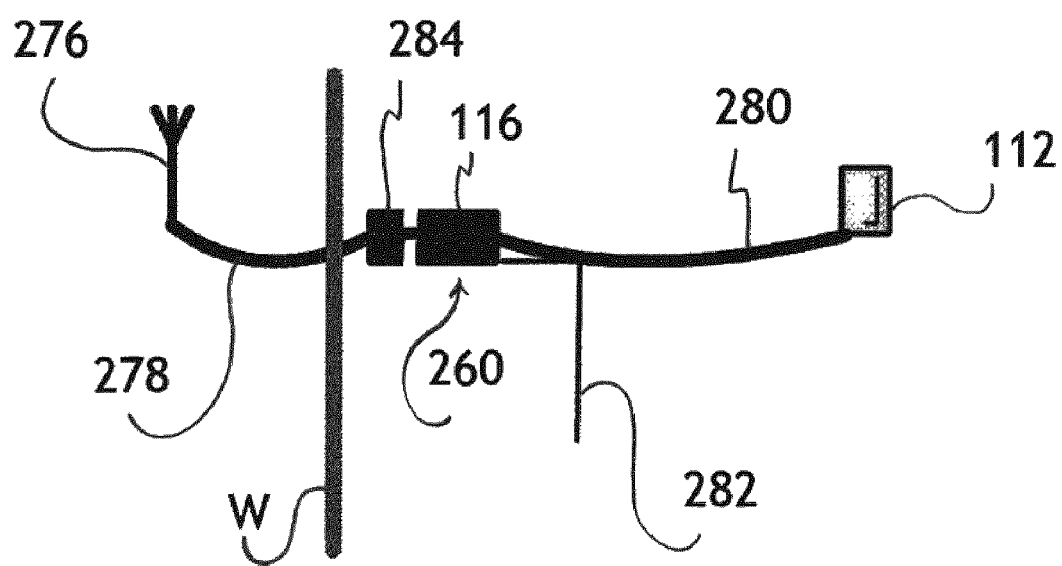
FIG. 8 is a schematic representation of the arrangement including the wall outlet assembly having the DC power injector shown in FIG. 7.

With reference now to FIGS. 7 and 8, the active faceplate system can be enhanced with a direct current (DC) power injector capability. A plurality of active wall outlet assemblies 112 are operatively connected to a controlled distribution panel (CDC) 116. A direct current (DC) power injector sub-system 260 includes a direct current (DC) power injector component 262. With the present DC power injector capability, both wireless communications signals and DC power may be distributed to the active faceplates over a common carrier. Active or passive wall outlet assembly faceplates can be used.

The DC power injector capability includes an isolating device for isolating a first signal power booster and a second signal power booster from one another. Turning now to FIG. 7, the DC power injector component sub-system 260 includes a DC power injector component 262 formed on a printed circuit board 264. It will be understood by those skilled in the art that terminal boards and discrete components such as resistors, capacitors, inductors, transistors and the like may be used on a printed circuit board or other integrated circuits may be applied. It should also be noted that terminal boards and discrete components may be wired directly to one another without using a printed circuit board without departing from the spirit and scope of the present invention.

The printed circuit board 264 includes a plurality of printed trace conductors 268 extending between components to form a signal path, as set forth in greater detail hereinafter. An array of signal input elements 266 is provided for inputting wireless communications signals into the signal path and to the DC power injector component 262. A second array of input elements 272 is provided for input of the DC power signals into the signal path and into the DC power injector component 262. An array of output elements 270 is provided on the circuit board 264 in electrical communication with the printed trace conductors to conclude the signal path from the wireless communication signal input elements 266 to the signal output elements 270, via the DC power injector component 262.

One or more signals may be distributed over the printed circuit board 264 by a signal distribution network formed from the printed trace conductors 268. The printed trace conductors 268 define the map of the circuit including the spacing among components and provide a signal path from the signal input elements 266 to the signal output elements 270.

The DC power injector component 262 includes a filter arrangement 274 disposed on the printed circuit board 264 along the signal path and in communication with the signal input elements 266 and output elements 270. Filters 274 disposed inside the DC power injector component 262 include a high frequency inductor or choke to isolate the wireless communication signals from the DC power signals. At least one of the filters may be a high pass filter. The filtered wireless communication signals are transmitted with the DC power signals over a cable to the at least one active faceplate, as will be seen in greater detail hereinafter. TV injection is also inserted by input at the signal input elements 266. A filtering mechanism contains cell signal from exiting the system through the input location.

With reference to FIG. 8, the DC power injector component subsystem 260 is integrated with the patch panel 116 on the wireless control portion of the system illustrated in FIG. 8. It should be noted that some of the system components may be disposed on the outside of a building as represented by a wall W as seen in FIG. 8.

With continued reference to FIG. 8, a system for distribution of wireless communication signals is illustrated. There, a lightning protection element 284 is disposed interiorly of the wall W. An antenna 276 is provided for transmission and receipt of wireless communication signals and the antenna 276 is connected to the lightning protection element via cable 278. It should be noted while the antenna 276 is shown externally to the building wall W, those skilled in the art will appreciate that the antenna 276 could be within the confines of the building dependent on placement and construction and ultimately the strength of any signals transmitted or received by the antenna 276.

The wireless communication signal is directed along its path through the lightning protection element 284 into the patch panel 116. The DC power injector subsystem 260 is disposed within the patch panel 116. In that regard, DC power is introduced into the patch panel 116 from a power supply (not shown) using wiring 282. After the DC power signal is processed along with the wireless communication signal, both the DC power signal and the wireless communication signal are transmitted along cabling 280 to an active wall outlet assembly 112 for broadcast distribution of the wireless communication signal. It will be appreciated by those skilled in the art that while the present illustration in FIG. 8 illustrates a signal active wall outlet assembly 112, the present system is capable of supporting multiple faceplates dependent only on the availability of location, communication cable, and amplification.

In operation, wireless communication signals and DC power signals arrive substantially simultaneously for processing by the DC power injector component subsystem 260. DC power is directed from a power supply (not shown) though wiring 280 to the DC power input elements 266 disposed on the printed circuit board 264, as seen in FIG. 7. Returning to FIG. 8, wireless communications signals enter the external antenna 276 and are directed through a cable 278 to the lightning protection element 284. The external antenna 276 is illustrated in FIG. 8 as being outside a wall W. It will be understood by those skilled in the art that the external antenna need not be external to the building housing the present system. The lightning protection element 284 directs the wireless signal to the patch panel 116 where it is in turn directed to the DC power injector component 262 for continued processing including filtering and the introduction of the DC power signal into the signal path.

Referring to FIG. 8, the output from the DC power injector component is directed to the at least one active wall outlet assembly 112 through an output cable 280. From there, the combined wireless communication signal and DC power signal are distributed to a plurality of active wall outlet assemblies 112, with the DC power serving the basic DC voltage needs of the faceplate and the wireless communication signal being transmitted using the external broadcast antenna 390.

By the above, the present DC power injector component subsystem 360 facilitates the combination of a wireless communication signal with a DC power signal for common distribution to one or more active faceplates. The simultaneous signal transfer occurs without interference between the DC power signal and the wireless communication signal because of the filters in the DC power injector component. Therefore, by the present system, all of the DC operational power needs at the active faceplates are satisfied by transmission of the DC power signal as power through the cable carrying the wireless communication signal, thereby saving additional wiring and additional labor installing such additional wiring.

Figure 9:
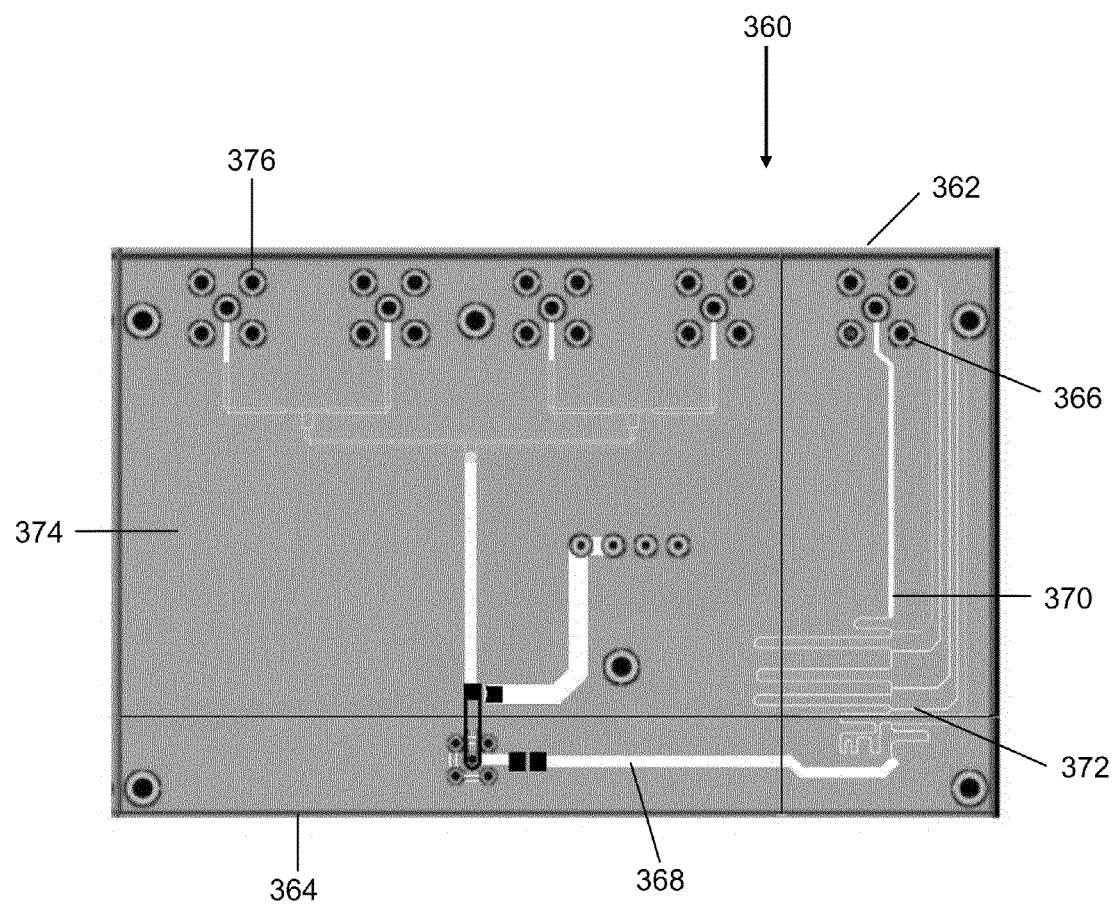
FIG. 9 is a schematic printed circuit representation of a TV injector for operation with the wall outlet assembly shown in FIG. 5.
Figure 10:
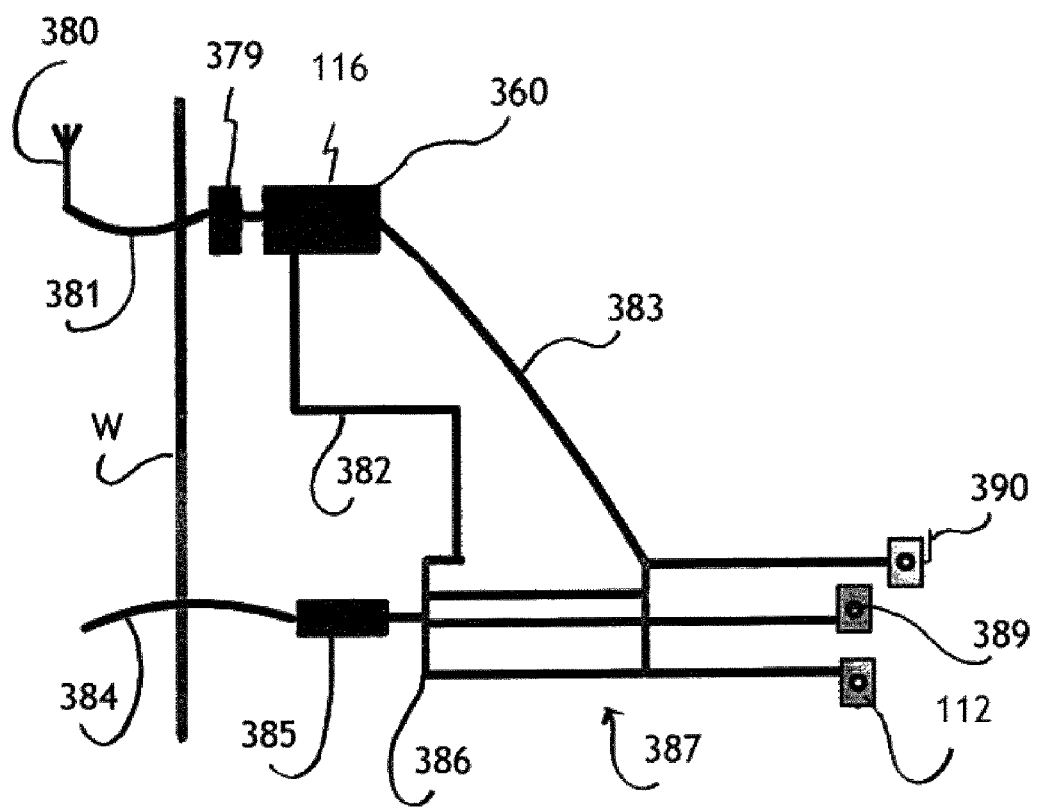
FIG. 10 is a schematic representation of an arrangement for a communication system in accordance with the present invention having a plurality of wall outlets having TV injectors.

With reference now to FIGS. 9 and 10, the active faceplate system can be enhanced with a television (TV) injector component capability, thereby allowing both cable TV signals and wireless communication signals to be propagated along a wired cable TV distribution network. To that end, a plurality of active wall outlet assemblies 112 are operatively connected to a patch panel 116 using a multi-cable distribution system which is preferable formed using coaxial cable. This allows wireless communications signals to be introduced and distributed over an existing extensive, multi-outlet cable TV installation, such as in a hotel or hospital, thereby saving the time and expense of installing an additional cable network. A television (TV) injector component sub-system 360 is operatively coupled to the patch panel 116, preferably as a plug-in circuit board, as more fully explained below.

The TV injector component sub-system 360 includes a TV injector component 362 formed on a printed circuit board 364. It will be understood by those skilled in the art that terminal boards and discrete components such as resistors, capacitors, inductors, transistors and the like may be used on a printed circuit board or other integrated circuits may be applied. It should also be noted that terminal boards and discrete components may be wired directly to one another without using a printed circuit board without departing from the spirit and scope of the present invention.

The printed circuit board 364 of the present invention includes an array of signal inputs 366 for introducing TV signals and wireless communications signals into the TV injector to be transmitted to the wall outlet assemblies. One or more signals may be distributed over the printed circuit board 364 as necessary by a signal distribution network formed from printed trace conductors illustrated generally at 368. The printed trace conductors 368 define the map of the circuit including the spacing among components and provide a signal path from the signal input elements 366 to the signal output elements 376.

The signal input elements 366 are arranged on the printed circuit board 364 for receiving wireless communications signals as well as cable TV signals for processing by the TV injector component 362. A first filter group 370 having low pass filters is disposed on the printed circuit board 364 along the signal path in communication with the signal input elements 366. The first filter group 370 permits cable TV (CATV) signals to be passed to the wall outlet assemblies and eliminates the cable TV signals that occur over the wireless protocol carrier frequencies. At least one of the filters of the first filter group 370 may be a low pass filter to eliminate cable TV signals above which there will be interference with the wireless communication services. The filtered cable TV signals are distributed with the wireless communication signals over the multi-cable distribution system as will be seen in greater detail hereinafter.

Another filter 372 is also disposed along the signal path across the printed trace conductors 368 to prevent the cable TV signals from being directed into an operating band of a signal booster (not shown) associated with the wireless communications system. A tree-like arrangement of printed trace conductors are provided on the printed circuit board 364 along the signal path to direct the filtered CATV and combined wireless carrier signals to a plurality of output elements 376 provided for signal distribution.

Turning now to FIG. 10, a system for distributing wireless communication signals in combination with cable TV signals is illustrated. There, the television injector component subsystem 360 is seen to be integrated with the patch panel 116 on the wireless control portion of the active faceplate system illustrated therein. It should be noted that some of the system components are disposed on the outside of a building as represented by a wall W. Connection of the standard CATV system via an appropriate cable allows injection of wireless signals such that wireless and CATV signals can now be provided at the wall outlet assemblies.

For the wireless communication portion of the system, an external antenna 380 is disposed on the outer portion of the wall W and is connected to the remainder of the system using a cable 381 and, more specifically, to a patch panel 116 for receipt of wireless communication signals for distribution. It should be noted that, while the antenna 380 is shown externally to the building wall W, those skilled in the art will appreciate that the antenna 380 could be within the confines of the building dependent on placement and construction and ultimately the strength of any signals receivable by the antenna 380 and transmittable by the patch panel 116. The lightning protection element 379 is connected to the patch panel 116. The TV injector component subsystem 362 is disposed within the patch panel 116. Distribution of the wireless signal is effected via the multi-cable distribution network 387 as will be explained in greater detail hereinafter. Certain wall outlet assemblies 112 are equipped with antennas 390 for broadcast distribution of the wireless communications signal with CATV signals simultaneously.

On the cable TV portion of the system, a cable TV amplifier 385 receives a signal from outside the wall W on cable 384. The cable TV amplifier 385 amplifies the signal as necessary for multiple distribution and sends the signal to a splitter 386 that splits the signal into multiple signals for distribution along a multi-cable distribution network 387 to individual active face plates 112. Cable TV signals are available at the active face plates 112 with an associated cable jack 389.

The cable TV system is interconnected with the wireless communication system using an input cable 382 extending from the splitter to the patch panel 116. The combined cable TV signal and wireless communication signal as processed by the TV injector component subsystem 360 is distributed to the cable distribution network 387 over cable 383 extending between the patch panel 116 and the distribution network 387.

In operation, wireless communication signals and cable TV signals arrive substantially simultaneously for processing by the television injector component subsystem. Wireless communications signals enter an external antenna 380 and are directed through a cable 381 to a patch panel 116. The patch panel 116 directs the wireless signal to the television injector component 362 for continued processing.

A TV cable signal arrives at the building wall W and is directed through coaxial cables 384 in to a cable TV amplifier 385. The cable TV amplifier 385 amplifies the incoming cable signal so that it will be strong enough after distribution for normal use. The cable signal is directed to a cable TV splitter 386 and from there it is directed to the CDC using a coaxial cable 382. The signal from the cable TV splitter 386 is directed through the input elements 366 as seen in FIG. 9 for further processing by the filters 370, 372 before distribution.

Referring again to FIG. 10, the output from the TV injector component subsystem 360 is directed to the cable distribution system 387 through an output cable 383. From there, the combined wireless communication signal and TV cable signal are distributed to a plurality of active wall outlet assemblies 112, each of which may be equipped with either a cable TV jack 389, an external broadcast antenna 390, or both.

By the above, the present TV injector component subsystem 360 facilitates the combination of a wireless communication signal with a cable TV signal for common distribution on a building's pre-existing cable distribution network. By operation of the TV signal injector component, the simultaneous signal transfer occurs without crosstalk between the wireless communication signal and the TV cable signal.

From the foregoing description of one embodiment of the invention, it will be apparent that many modifications may be made therein. It will be understood that this embodiment of the invention is an exemplification of the invention only and that the invention is not limited thereto.

What is claimed is:
1. A communication system, comprising:
    a lightning protection element;
    a distribution module;
    a plurality of wall outlet assemblies;
    a plurality of conduit stems; each conduit stem being connected to a respective wall outlet assembly and being operable to carry signals between the respective wall outlet assembly and a location at which the distribution module obtains the signals; the distribution module and each wall outlet assembly having an operating relationship between each other such that both a bridging signal and a separate task signal are carried between the distribution module and the respective wall outlet assembly with the particular signal being carried on the respective conduit stem connected to the wall outlet assembly; the distribution module and the lightning protection element being operatively connected to one another such that bridging signals pass therebetween; the lightning protection element being operable to transmit or receive wireless signals; each wall outlet assembly having a capability to transmit a wireless signal to, or receive a wireless signal from, a wireless signal device and in the event that the wall outlet assembly transmits a wireless signal, the wall outlet assembly generates the wireless signal in response to a bridging signal provided to the wall outlet assembly via the distribution module, and in the event that the wall outlet assembly receives a wireless signal, the wall outlet assembly sends a corresponding bridging signal along its conduit to ultimately reach the distribution module; and each wall outlet assembly having an access portion for access between the wall outlet assembly and a separate task executing device such that separate task signals are passed between the wall outlet assembly and the separate task executing device;
    the distribution module includes a first signal power booster for increasing the power of bridging signals on a first frequency band received from the lightning protection element;
    a second signal power booster for increasing the power of bridging signals on a second frequency band received from the lightning protection element; and an isolating device for isolating the first signal power booster and the second signal power booster from one another;

the isolating device includes a diplexer having a common input port and a pair of output ports; the common input port of the diplexer being operable to receive both bridging signals on the first frequency band and bridging signals on the second frequency band; one of the pair of output ports being operable to permit bridging signals on the first frequency band to exit the diplexer but not bridging signals on the second frequency band; and the other of the pair of output ports being operable to permit bridging signals on the second frequency band to exit the diplexer but not bridging signals on the first frequency band.

2. A communication system, comprising:

a lightning protection element;

a distribution module;

a plurality of wall outlet assemblies;

a plurality of conduit stems; each conduit stem being connected to a respective wall outlet assembly and being operable to carry signals between the respective wall outlet assembly and a location at which the distribution module obtains the signals; the distribution module and each wall outlet assembly having an operating relationship between each other such that both a bridging signal and a separate task signal are carried between the distribution module and the respective wall outlet assembly with the particular signal being carried on the respective conduit stem connected to the wall outlet assembly; the distribution module and the lightning protection element being operatively connected to one another such that bridging signals pass therebetween; the lightning protection element being operable to transmit or receive wireless signals; each wall outlet assembly having a capability to transmit a wireless signal to, or receive a wireless signal from, a wireless signal device and in the event that the wall outlet assembly transmits a wireless signal, the wall outlet assembly generates the wireless signal in response to a bridging signal provided to the wall outlet assembly via the distribution module, and in the event that the wall outlet assembly receives a wireless signal, the wall outlet assembly sends a corresponding bridging signal along its conduit to ultimately reach the distribution module; each wall outlet assembly having an access portion for access between the wall outlet assembly and a separate task executing device such that separate task signals are passed between the wall outlet assembly and the separate task executing device;

the lightning protection element is an antenna operable to receive and transmit wireless signals; each of the conduit stems interconnects the distribution module and a wall outlet assembly; at least one of the wall outlet assemblies includes a first signal power booster for increasing the power of bridging signals;

the at least one of the wall outlet assemblies includes a second signal power booster for increasing the power of bridging signals and a second diplexer operatively connected with the second signal power booster;

the at least one of the wall outlet assemblies includes a resistive trimming function for manually adjusting an output power of a signal processed by one of the associated pairs of the first signal power booster and the first diplexer and the second signal booster and the second diplexer.

3. A communication system, comprising:

an antenna;

a distribution module;

a plurality of wall outlet assemblies;

a plurality of conduit stems; each conduit stem being connected to a respective wall outlet assembly and being operable to carry signals between the respective wall outlet assembly and a location at which the distribution module obtains the signals; the distribution module and each wall outlet assembly having an operating relationship between each other such that both a bridging signal and a separate task signal are carried between the distribution module and the respective wall outlet assembly with the particular signal being carried on the respective conduit stem connected to the wall outlet assembly; the distribution module and the antenna being operatively connected to one another such that bridging signals pass therebetween; the antenna being operable to transmit or receive wireless signals; each wall outlet assembly having a capability to transmit a wireless signal to, or receive a wireless signal from, a wireless signal device and in the event that the wall outlet assembly transmits a wireless signal, the wall outlet assembly generates the wireless signal in response to a bridging signal provided to the wall outlet assembly via the distribution module, and in the event that the wall outlet assembly receives a wireless signal, the wall outlet assembly sends a corresponding bridging signal along its conduit to ultimately reach the distribution module; and each wall outlet assembly having an access portion for access between the wall outlet assembly and a separate task executing device such that separate task signals are passed between the wall outlet assembly and the separate task executing device;

the distribution module includes a first signal power booster for increasing the power of bridging signals on a first frequency band received from the antenna; a second signal power booster for increasing the power of bridging signals on a second frequency band received from the antenna; and an isolating device for isolating the first signal power booster and the second signal power booster from one another;

the isolating device includes a diplexer having a common input port and a pair of output ports; the common input port of the diplexer being operable to receive both bridging signals on the first frequency band and bridging signals on the second frequency band;

one of the pair of output ports being operable to permit bridging signals on the first frequency band to exit the diplexer but not bridging signals on the second frequency band; and the other of the pair of output ports being operable to permit bridging signals on the second frequency band to exit the diplexer but not bridging signals on the first frequency band.

4. A communication system, comprising:

an antenna;

a distribution module;

a plurality of wall outlet assemblies;

a plurality of conduit stems; each conduit stem being connected to a respective wall outlet assembly and being operable to carry signals between the respective wall outlet assembly and a location at which the distribution module obtains the signals; the distribution module and each wall outlet assembly having an operating relationship between each other such that both a bridging signal and a separate task signal are carried between the distribution module and the respective wall outlet assembly with the particular signal being carried on the respective conduit stem connected to the wall outlet assembly; the distribution module and the antenna being operatively connected to one another such that bridging signals pass therebetween; the antenna being operable to transmit or receive wireless signals; each wall outlet assembly having a capability to transmit a wireless signal to, or receive a wireless signal from, a wireless signal device and in the event that the wall outlet assembly transmits a wireless signal, the wall outlet assembly generates the wireless signal in response to a bridging signal provided to the wall outlet assembly via the distribution module, and in the event that the wall outlet assembly receives a wireless signal, the wall outlet assembly sends a corresponding bridging signal along its conduit to ultimately reach the distribution module; each wall outlet assembly having an access portion for access between the wall outlet assembly and a separate task executing device such that separate task signals are passed between the wall outlet assembly and the separate task executing device;

the antenna is operable to receive and transmit wireless signals; each of the conduit stems interconnects the distribution module and a wall outlet assembly; at least one of the wall outlet assemblies includes a first signal power booster for increasing the power of bridging signals;

the at least one of the wall outlet assemblies includes a second signal power booster for increasing the power of bridging signals and a second diplexer operatively connected with the second signal power booster;

the at least one of the wall outlet assemblies includes a resistive trimming function for manually adjusting an output power of a signal processed by one of the associated pairs of the first signal power booster and the first diplexer and the second signal booster and the second diplexer.

\* \* \* \* \*